US007106298B1

(12) United States Patent
Turner et al.

(10) Patent No.: US 7,106,298 B1
(45) Date of Patent: Sep. 12, 2006

(54) ARRANGEMENT FOR ARBITRATION OF DISPLAY INFORMATION FROM MULTIPLE APPLICATIONS FOR A NETWORK ENABLED DISPLAY DEVICE

(75) Inventors: Bryan C. Turner, Apex, NC (US); John Toebes, Cary, NC (US)

(73) Assignee: Cisco Technology, Inc., San Jose, CA (US)

( * ) Notice: Subject to any disclaimer, the term of this patent is extended or adjusted under 35 U.S.C. 154(b) by 671 days.

(21) Appl. No.: 09/955,129

(22) Filed: Sep. 19, 2001

(51) Int. Cl.
*G09G 5/00* (2006.01)

(52) U.S. Cl. .................. 345/156; 345/1.1; 715/728; 709/203

(58) Field of Classification Search ................ 345/204, 345/156, 700, 728, 733, 734, 735, 737, 738, 345/740, 739, 744, 746, 760, 762, 764, 781, 345/783, 157, 1.1, 1.2; 715/728, 729, 744, 715/753, 781, 788; 709/203, 220
See application file for complete search history.

(56) References Cited

U.S. PATENT DOCUMENTS

| | | | | |
|---|---|---|---|---|
| 5,615,384 A | * | 3/1997 | Allard et al. ................ 345/800 |
| 5,712,995 A | * | 1/1998 | Cohn .......................... 715/792 |
| 6,129,449 A | * | 10/2000 | McCain et al. ............. 700/244 |
| 6,173,246 B1 | * | 1/2001 | Billups, III ................... 703/22 |
| 6,204,847 B1 | * | 3/2001 | Wright ........................ 345/804 |
| 6,275,226 B1 | * | 8/2001 | Uchida et al. .............. 345/744 |
| 6,717,593 B1 | * | 4/2004 | Jennings ..................... 345/760 |
| 6,731,992 B1 | * | 5/2004 | Ziegler, Jr. ................... 700/65 |
| 2003/0026244 A1 | * | 2/2003 | Pietrowicz et al. ......... 370/352 |

* cited by examiner

*Primary Examiner*—Xiao Wu
(74) *Attorney, Agent, or Firm*—Leon R. Turkevich

(57) ABSTRACT

A network-enabled user interface device, for example a VoIP telephony device, includes a display, a user input interface, an interface controller, and an application controller. The display is logically defined to include multiple distinct display areas. The interface controller is configured for generating display elements for the respective display areas based on received display requests, and controlling the user input interface based on received commands, and outputting responses to the application controller. The application controller is configured for supplying the commands to the interface controller and display requests based on execution of application operations. The application operations may be executed locally (i.e., within the user interface device), or remotely (e.g., by a server in communication with the user interface device). Remote application operations may include communications between the application controller and the remote server. The interface controller includes an arbitrator configured for selecting, for each display area, a corresponding display element to be displayed based on the received display requests, and based on determined conditions such as application state based on user input. Hence, multiple display elements for different application services may be selected for simultaneous display in respective display areas on the network-enabled user interface device based on prescribed conditions; moreover, the display may be dynamically changed by the arbitrator based on prescribed conditions, for example user input, an application state change, or a prescribed detected event.

48 Claims, 4 Drawing Sheets

ARRANGEMENT FOR ARBITRATION OF DISPLAY INFORMATION FROM MULTIPLE APPLICATIONS FOR A NETWORK ENABLED DISPLAY DEVICE

BACKGROUND OF THE INVENTION

1. Field of the Invention

The present invention relates to control of display data on network enabled user devices, for example Voice over IP Telephones, configured for displaying data for multiple service operations.

2. Description of the Related Art

Telephony devices have advanced to provide enhanced features for business consumers. For example, a business premises deploying a Private Branch Exchange (PBX) for intraoffice or interoffice communications utilizes telephony devices capable of receiving messages from the PBX, including a time of day string or a calling party identity string. However, proprietary PBX systems limit the availability of features that can be added to the telephony device. In addition, proprietary PBX systems typically provide voice-only services, such that text, data, or images cannot be transferred to the telephony device.

Voice over IP (VoIP) technology has evolved to provide network enabled telephony devices, for example Voice over IP telephony devices, configured for performing multiple operations that emulate a telephony device. VoIP telephony devices often include large display screens or other display capabilities, enabling new service features to be provided for a user. For example, the VoIP telephones, such as the commercially-available Cisco Telecaster 7960 IP Telephone from Cisco Systems, San Jose, Calif., includes user input and display operations. These user input and display operations enable a user to access multiple windows displaying respective applications based on soft key or hard key inputs, such as accessing a central telephone directory for retrieval of an employee's telephone number using a search query or selection from the displayed list. A user of the VoIP telephone can access one window configured for displaying call status (e.g., duration of call, called party identity), or access another window configured for displaying the central telephone directory.

The executable software resident in the VoIP telephone, however, tends to be device-specific. Hence, the executable software needs to be rewritten for newer VoIP telephones having different hardware configurations (e.g., different sets of hard buttons, color display vs. greyscale display, different-sized display, etc.), although compatability issues may be reduced using hardware abstraction layers and input abstraction layers between the telephone display controller, the display portion, and the input portion. Moreover, the device-specific nature of the VoIP telephone software limits the manner in which different application services can be added to the VoIP telephone device for the device user: the VoIP telephone software needs to be modified to add the different application services. In addition, the VoIP telephone typically is configured for communication with a single call server, resulting in additional resource requirements imposed on the call server as services are added.

Browser-based telephony device technology is being implemented in wireless telephones using Wireless Application Protocol (WAP). In particular, WAP uses Extensible Markup Language (XML) technology to communicate interface changes to wireless devices such as digital wireless telephones and pagers, enabling applications and services to be provided to the digital wireless telephones. The use of XML tags enables the data to be displayed on the digital wireless telephone display in a prescribed manner.

The WAP-based approach to displaying data on the digital wireless telephone still suffers from the disadvantage that the input and display controllers of the digital wireless telephone interact with a single WAP portal (i.e., server), limiting the flexibility of the telephony device operations. In particular, a user is unable to send or receive a wireless telephone call on his or her web-enabled digital wireless telephone while using the digital wireless telephone to access the Internet.

Hence, the WAP-based systems still limit flexibility in delivering user interface applications to a telephony user.

Existing display technology for personal computers utilizes an application resource to control at least a portion of a display. Hence, a computer executing a Microsoft Windows operating system opens up a new window for each application instance, where the application instance controls the contents of the display area within the window. The user may initiate multiple application instances and control the size and location of each corresponding window using a mouse, such that there may be overlapping windows, however each application instance still retains control of the corresponding nonoverlapping area.

Use of a user pointing device, such as a mouse, however, is not practical on certain user devices, such as the Voice over IP telephony device, hence overlapping windows cannot be easily controlled on the display of the user device. Moreover, the limited size of the display on the user device renders impractical the use of overlapping windows. Hence, the Microsoft Windows type system is not practical for use for controlling the display of multiple application services on a Voice over IP telephony device.

SUMMARY OF THE INVENTION

There is a need for an arrangement that enables multiple application services to be displayed on a network-enabled user device, for example a VoIP telephony device having a display, independent of the hardware implementation of the display.

There also is a need for an arrangement that enables a multiple application services to be displayed on a network-enabled user device, for example a VoIP telephony device, according to an open protocol.

There also is a need for an arrangement that enables multiple application servers to provide display content to an IP-based client device, for example a VoIP telephony device, in a manner that enables the VoIP telephony device to retain control of the presentation of the display content to the user.

There also is a need for an arrangement that enables a network-enabled user device, for example a VoIP telephony device, to control the simultaneous display of selected application display objects from respective application services without the necessity of overlapping window regions.

These and other needs are attained by the present invention, where a network-enabled user interface device, for example a VoIP telephony device, includes a display, a user input interface, an interface controller, and an application controller. The display is logically defined to include multiple distinct display areas. The interface controller is configured for generating display elements for the respective display areas based on received display requests, and controlling the user input interface based on received commands, and outputting responses to the application controller. The application controller is configured for supplying the commands to the interface controller and display requests based on execution of application operations. The application operations may be executed locally (i.e., within the user interface device), or remotely (e.g., by a server in communication with the user interface device). Remote application operations may include communications between the application controller and the remote server. The interface controller includes an arbitrator configured for selecting, for each display area, a corresponding display element to be displayed based on the received display requests, and based on determined conditions such as application state based on user input. Hence, multiple display elements for different application services may be selected for simultaneous display in respective display areas on the network-enabled user interface device based on prescribed conditions; moreover, the display may be dynamically changed by the arbitrator based on prescribed conditions, for example user input, an application state change, or a prescribed detected event.

One aspect of the present invention provides a network-enabled user interface device. The device includes a display screen configured for displaying display elements within respective distinct display areas, a user input interface configured for supplying user inputs, an application controller, and an interface controller. The application controller is configured for obtaining display requests from executable application resources, and includes a network interface configured for receiving at least a portion of the display requests from a corresponding remote group of the executable application resources via an open protocol network. The interface controller is configured for defining the distinct display areas and outputting the display elements for the respective distinct display areas, and includes an arbitrator configured for selecting, from the display requests, the display element for each corresponding display area based on at least one of a corresponding determined condition and a determined presence of a selected one of the user inputs. Use of the interface controller to define the distinct display areas simplifies the display of display elements, since application resources can send requests in the form of an application programming interface for the display of prescribed application objects, eliminating the necessity of application-based control of the display. Moreover, use of the arbitrator enables the device to centrally control the display based on detecting events including user inputs, received event messages, and received display requests from executable applications. Hence, multiple arbitrary applications may be executed remotely while the user interface device dynamically controls the display based on display state and detected events.

Another aspect of the present invention provides a method of controlling a display screen of a network-enabled user interface device configured for network-based communications via an open protocol network. The method includes receiving application-based display requests from executable application resources, at least a portion of the display requests received via an open protocol network. The method also includes selecting display elements to be displayed within respective distinct display areas of a display screen, based on arbitrating the display requests relative to at least one of a corresponding determined condition and a determined presence of a selected user input, and outputting the display elements for display within the respective distinct display areas.

Additional advantages and novel features of the invention will be set forth in part in the description which follows and in part will become apparent to those skilled in the art upon examination of the following or may be learned by practice of the invention. The advantages of the present invention may be realized and attained by means of instrumentalities and combinations particularly pointed out in the appended claims.

BRIEF DESCRIPTION OF THE DRAWINGS

Reference is made to the attached drawings, wherein elements having the same reference numeral designations represent like elements throughout and wherein.

BEST MODE FOR CARRYING OUT THE INVENTION

The disclosed embodiment is directed to an arrangement for controlling the display of a user interface device based on generation of display elements for respective display areas, where display requests are arbitrated to select the appropriate display element for each corresponding display area. Hence, the use of arbitration for prescribed display areas enables use of a message-based display arrangement, where executable application resources, executed locally within the user interface device or remotely on the open protocol network, can send display requests for application objects to be displayed. Hence, the use of arbitration enables the display to be dynamically adjusted based on the received display requests, user inputs, or asynchronous events detected by the user interface device. A description will first be provided of the network enabled user interface device configured for receiving arbitrary application services via a network, followed by a detailed description of the arrangement for controlling the display based on arbitration of received display requests.

Figure 1:
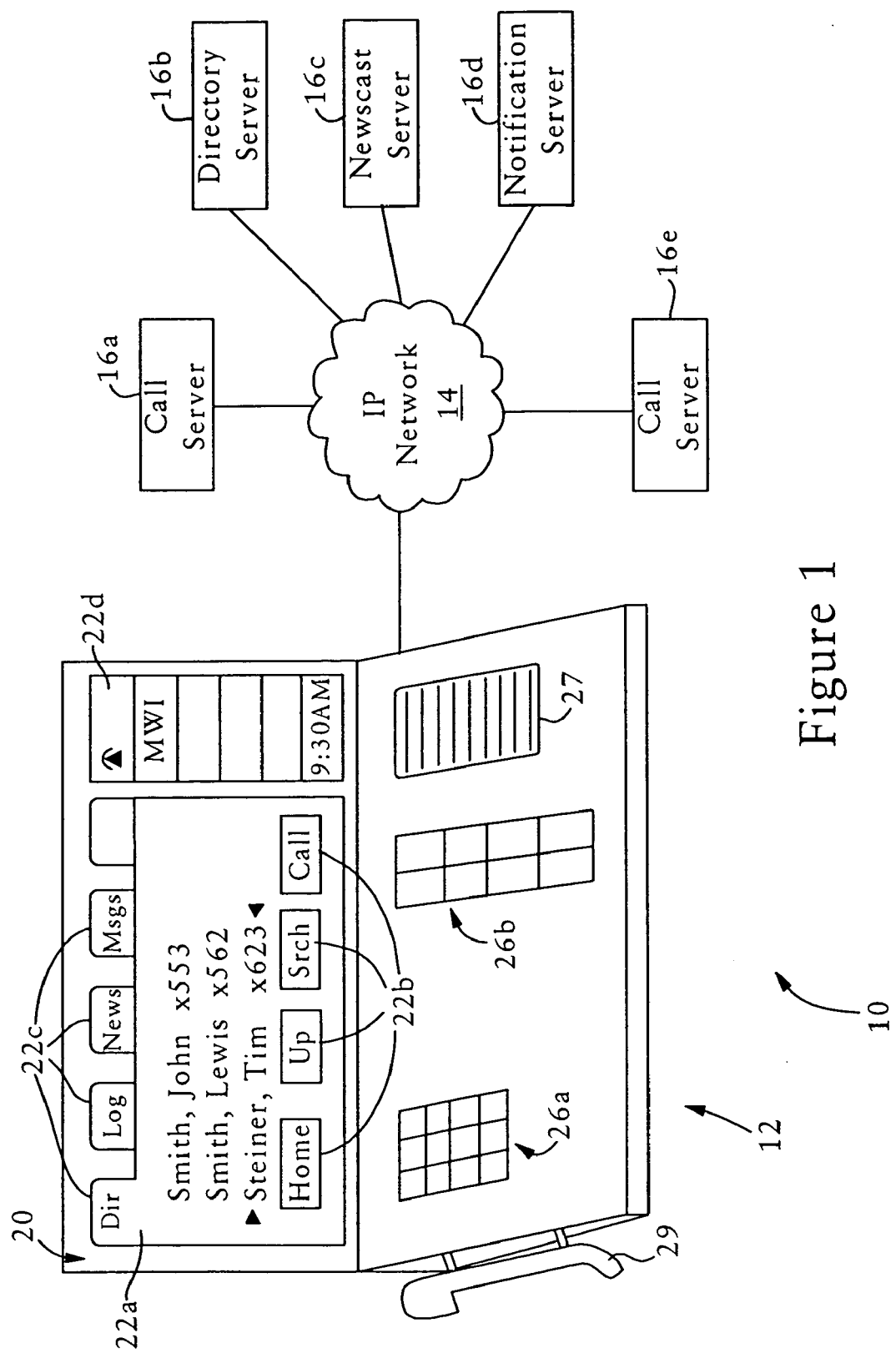
FIG. 1 is a block diagram illustrating a system for providing display of arbitrary applications to a network-enabled user interface device, for example a Voice over IP telephone device, according to an embodiment of the present invention.

FIG. 1 is a block diagram illustrating a system 10 for providing arbitrary applications to a network-enabled user interface device, for example a Voice over IP telephone device 12, according to an embodiment of the present invention. As shown in FIG. 1, the Voice over IP telephone device 12 is configured for communications by the IP network 14 with various servers 16 in communication with the Voice over IP telephone device 12 via the IP network 14. For example, the call servers 16a and 16e are configured for executing Voice over IP call processing applications according to a prescribed Voice over IP protocol, for example Media Gateway Control Protocol (MGCP) (RFC 2705), Session Initiation Protocol (SIP) (RFC 2543), H.323 protocol, etc. The corporate directory server 16b is configured for providing, for example, corporate telephone directory lists or email address lists, enabling a user of the Voice over IP device 12 to enter search queries based on name, location, reverse number search, etc. to identify the desired entry in the directory. The newscast server 16c is configured for providing selected newsworthy events, for example selected weather reports, stock quotes, and/or news headlines for internal corporate news or corporate news. The newscast server 16c may be configured for providing generic headlines, or user-specific headlines, as desired. The notification server 16d is configured for providing notification messages for prescribed events, for example receipt of a message in a unified messaging system (e.g., a received voicemail, e-mail, fax, SMS message).

Any of the services provided by the respective servers 16 can be supplied and displayed to the Voice over IP telephone device 12 based on commands (i.e., "requests") that specify GUI operations to be performed by the Voice over IP telephone device 12. In addition, a locally executable application (i.e., an application executed by the Voice over IP telephone device 12) may include a device manager configured for establishing a default communications with the call server 16a: the locally executable application also may specify GUI operations to be performed by generating a request, described below. If additional services are desired by the user of the Voice over IP telephone device 12, the user may generate a request for initiation of such services using, for example, a services installation application which may be executable locally within the Voice over IP telephone device 12, or a remote server such as the call server 16a.

In addition, the Voice over IP telephone 12 may receive notification messages from servers such as the newscast server 16c or the notification server 16d, independent of any actions by the user of the Voice over IP telephone device 12.

Hence, arbitrary services can be provided to the user of the Voice over IP telephone device 12 based on execution of local application or servers (i.e., remote applications), using a generic application-based command set for control and configuration of the user interface components of the Voice over IP telephone device 12 described below.

The Voice over IP telephone device 12 includes a display screen 20 configured for displaying display elements 22. For example, the display screen 20 may display an application window 22a having soft key buttons 22b for window-specific user input options. Additional display elements may be implemented as tab keys 22c that identify additional application services that may be selected by a user, where a user selects the corresponding application by pressing the corresponding tab 22c. Additional display elements may be implemented as telephone device elements 22d that may indicate device-specific state information, any one of which may be used to provide a hierarchal menu list based on pressing the corresponding soft key input.

Figure 2:
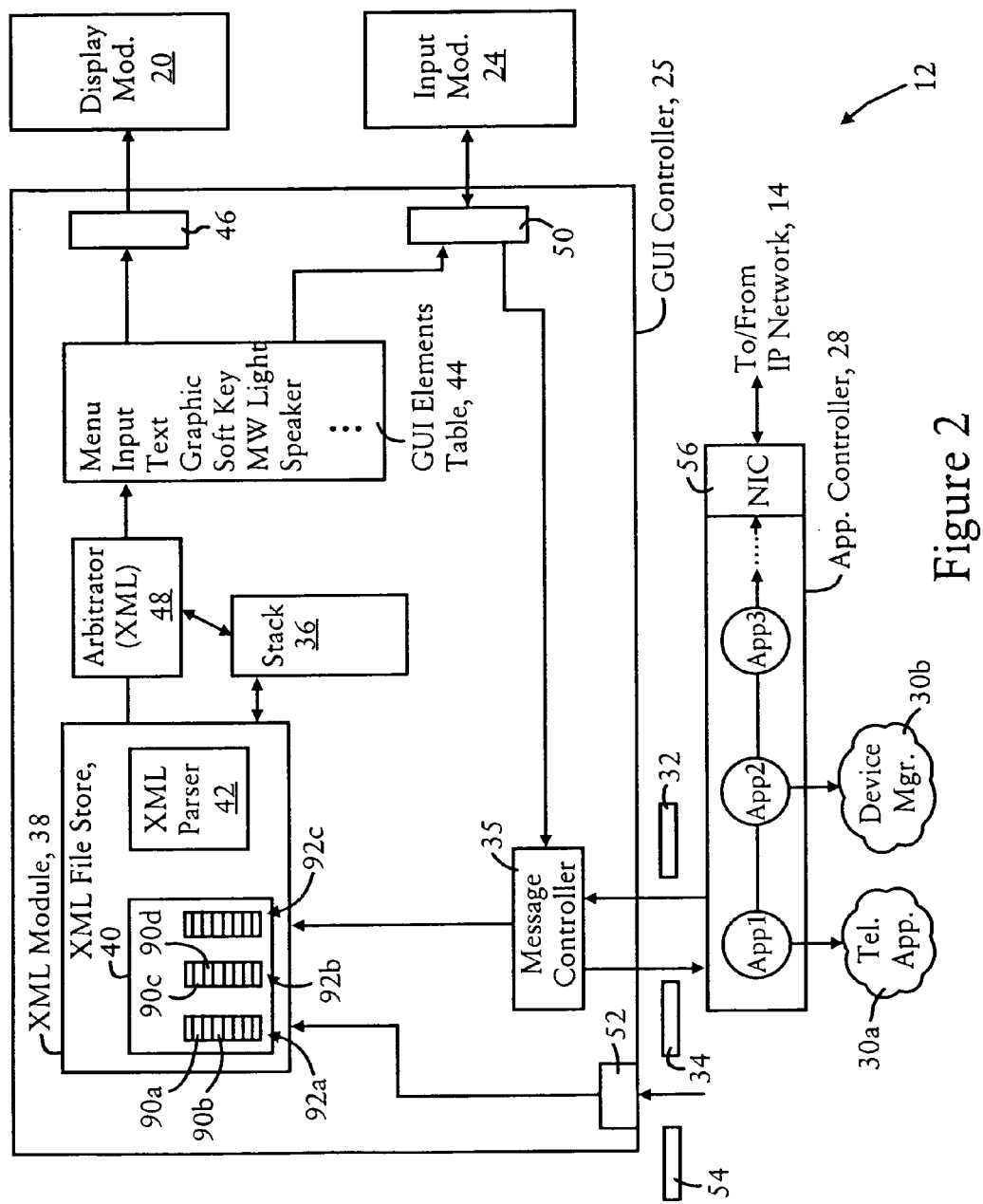
FIG. 2 is a diagram illustrating in detail the Voice over IP telephone device of FIG. 1 according to an embodiment of the present invention.

FIG. 2 is a diagram illustrating in detail the Voice over IP telephony device 12 according to an embodiment of the present invention. As described above, the device 12 includes a display module 20 configured for displaying display elements within respective distinct display areas, described in further detail below with reference to FIG. 3. The Voice over IP telephone device 12 includes a user input interface 24 configured for detecting user inputs to soft key elements (e.g., 22b, 22c, or 22d) or hard key elements 26, illustrated in FIG. 1 as a twelve button keypad 26a, and function keys 26b. Hence, the user input interface 24, illustrated in FIG. 2, is configured for enabling the soft keys and the hard keys 26 based on application-based commands, and supplying user inputs for processing by the appropriate executable applications, described below. The Voice over IP telephone device 12 also includes audio driver circuitry (not shown) for playing audio files to an external speaker 27 distinct from the telephone handset 29.

The Voice over IP telephone device 12 also includes a graphic user interface (GUI) controller 25, and an application controller 28. The Voice over IP telephone device 12 also includes locally executable applications 30, for example a telephone application 30a configured for initiating and receiving Voice over IP based telephone calls between the call server 16a according to Voice over IP protocol, for example, Media Gateway Control Protocol (MGCP) (RFC 2705), Session Initiation Protocol (SIP) (RFC 2543), H.323 protocol, etc. Other examples of locally executable applications include a device manager 30b configured for managing local operation of the Voice over IP telephone device 12.

The GUI controller 25 is configured for receiving application-based commands (i.e., "requests") 32 from the application controller 28 that specify an application state (specified by an XML document 90) to be performed. For example, each application-based command 32 is received by the GUI controller 25 in the form of a text-based message, and specifies at least one of a display operation that specifies display parameters (e.g., an application object and corresponding application information) for a display element 22, an input operation specifying an input operation for a soft key or a hard key by the user input interface 24, and/or response logic enabling the GUI controller 25 to determine how to respond to a prescribed user input supplied by the user input interface 24.

The GUI controller 25 also is configured for outputting application-based responses (i.e., "posts") 34 based on the supplied user inputs from the user input interface 24 and based on the application-based commands that specify the manner in which the posts 34 should be generated. Hence, each application, executed locally (e.g., application 30) or remotely (e.g., a server 16), operate according to a request/response system, enabling deployment of arbitrary application within the Voice over IP telephone device 12 based on standardized messaging protocols, described below.

The Voice over IP telephone device 12 implements application-specific messaging using extensible markup language (XML) documents 90, referred to as "application state documents", that are used to define the generic messaging protocol (i.e., command set) available to executable applications. In particular, the GUI controller 25 includes a stack 36, and an XML module 38. The XML module 38 includes an XML file store 40 for storing XML documents 90, and an XML parser 42 for parsing a selected XML document. Each XML document 90 corresponds to a specified state of an executable application (hence the term "application state document"), and may reference another XML document. Each XML document 90 includes XML tags that specify an operation to be performed: for example, XML tags can specify the manner in which display elements 20 are to be displayed, how input operations are to be performed by the user input interface 24, how inputs supplied by a user should be interpreted, how audio files should be played, etc.

In other words, an XML document 90 can specify any operation to be performed, for example displaying text, graphics, or video (stored locally within the GUI controller 25 as interface elements or supplied from a remote location via the IP network), playing an audio (e.g., .wav) file (stored locally as an interface element or supplied with the command), or initiating a prescribed procedure. Each XML document 90 also has a corresponding identifier that enables the executable applications (e.g., 30 or 16) to identify for execution a prescribed interface operation (e.g., displaying a prescribed display element and providing prescribed input operations).

As described above, each XML document (e.g., 90*a*) specifies a prescribed application state, and may reference another XML document (e.g., 90*b*) that specifies another corresponding application state for the same executable application. Hence, the XML application state documents 90 are grouped into XML applications 92, where a group of application state documents 90 collectively define the XML-based application to be performed. Hence, the XML application state documents 90 are stored within an XML file store 40 in groups of XML applications 92*a*, 92*b*, and 92*c*. For example, the XML documents 90*a* and 90*b* specify respective states of the XML application 92*a*, and the XML documents 90*c* and 90*d* specify respective states of the XML application 92*b*.

The XML documents for a prescribed application typically are loaded in the XML file store 40 as default documents; alternately, newer application-specific XML documents 92 may be loaded into the XML file store 40 during registration of a new application service. A remote application service provided by a remote server 16 also may supply its own XML document, within the message 21 via the IP network 14, for parsing by the XML parser 42. The stack 36 is configured for storing active XML documents used by the GUI controller 25 for active applications, and display lists, described below with reference to FIG. 3. The XML parser 42 is configured for generating display element identifiers specifying display elements to be displayed (i.e., display operations), input identifiers that specify the input operations to be performed by the user input interface 24, and any other identifiers specified during the selected XML document based on the application-specific commands 32 (e.g., video or audio operations).

In particular, the graphic user interface (GUI) controller 35 is configured for parsing the text strings 32 and recovering the application specific commands (e.g., the XML document identifiers), and forwarding the application-specific commands to the XML module 38. For example, the application specific command may specify the XML document 90 to be retrieved from the XML file store 40 and parsed to determine the interface elements to be applied. The XML parser 42, upon parsing the selected XML document, outputs the identifiers specified in the parsed XML document to a GUI elements table 44.

The GUI elements table 44 is configured for storing available interface elements, for example menu elements, input elements, text elements, graphic elements, soft key elements, hardware light elements, speaker elements, etc. Each GUI element specifies instructions and parameters that enable the generation of the corresponding interface operation. The GUI elements table 44 outputs the selected elements to a display abstraction interface 46 and/or an input abstraction interface 50, or the speaker 27 as appropriate. The display abstraction interface 46 is configured for generating display-specific images for display of the respective display elements by the display screen 20, and the input abstraction interface 50 is configured for generating hardware-specific commands for configuration of the user input interface for the respective selected input operations.

Hence, the local and remotely executed applications control the user interface of the Voice over IP telephone device 12 by sending text-based messages to the GUI controller 25; the text-based messages are used to identify an XML document 90, stored in the XML file store 40, to be parsed for identification of display elements and selected input operations to be provided to the display screen 20 and the user input interface 24, respectively. The XML module 38 outputs the display element identifier and/or the input operation identifier, also referred to in FIG. 3 as application objects 64, in the form of a request 62 which is output to an arbitrator 48. The arbitrator 48 is configured for selecting the requests 62 that are executed immediately, as opposed to being cached, described below. The selected display element identifiers are supplied to the GUI elements table 44 for retrieving the display elements to be displayed and/or the input operations to be performed.

Specific data defining the display element and the input operations are retrieved from the GUI element table 44 and forwarded to the appropriate hardware abstraction interface 46 or 50. The hardware abstraction interfaces convert the supplied GUI elements to hardware-specific instructions to cause the display screen 20 and the user input interface 24 to provide the appropriate interface elements.

The GUI controller 25 also include a messaging interface 52 configured for receiving event messages 54, composed of text-based messaging. In particular, the event messages are time-oriented messages that specify the occurrence of prescribed events, for example a one second timer for updating the time display element, or other time-oriented messages occurring independently of local or remote application states. The event messages may be sent either to the XML module 38 for parsing a prescribed XML document 90 (e.g., for playing an audio or video announcement), or to the GUI elements table 44 for generation of a display element including the supplied text.

Additional details related to the execution of arbitrary applications by the Voice over IP telephony device 12 are disclosed in commonly-assigned, copending application Ser. No. 09/883,211, filed Jun. 19, 2001, entitled "Arrangement for Delivering Applications to a Network Enabled Telephony Device", the disclosure of which is incorporated in its entirety herein by reference.

Figure 3:
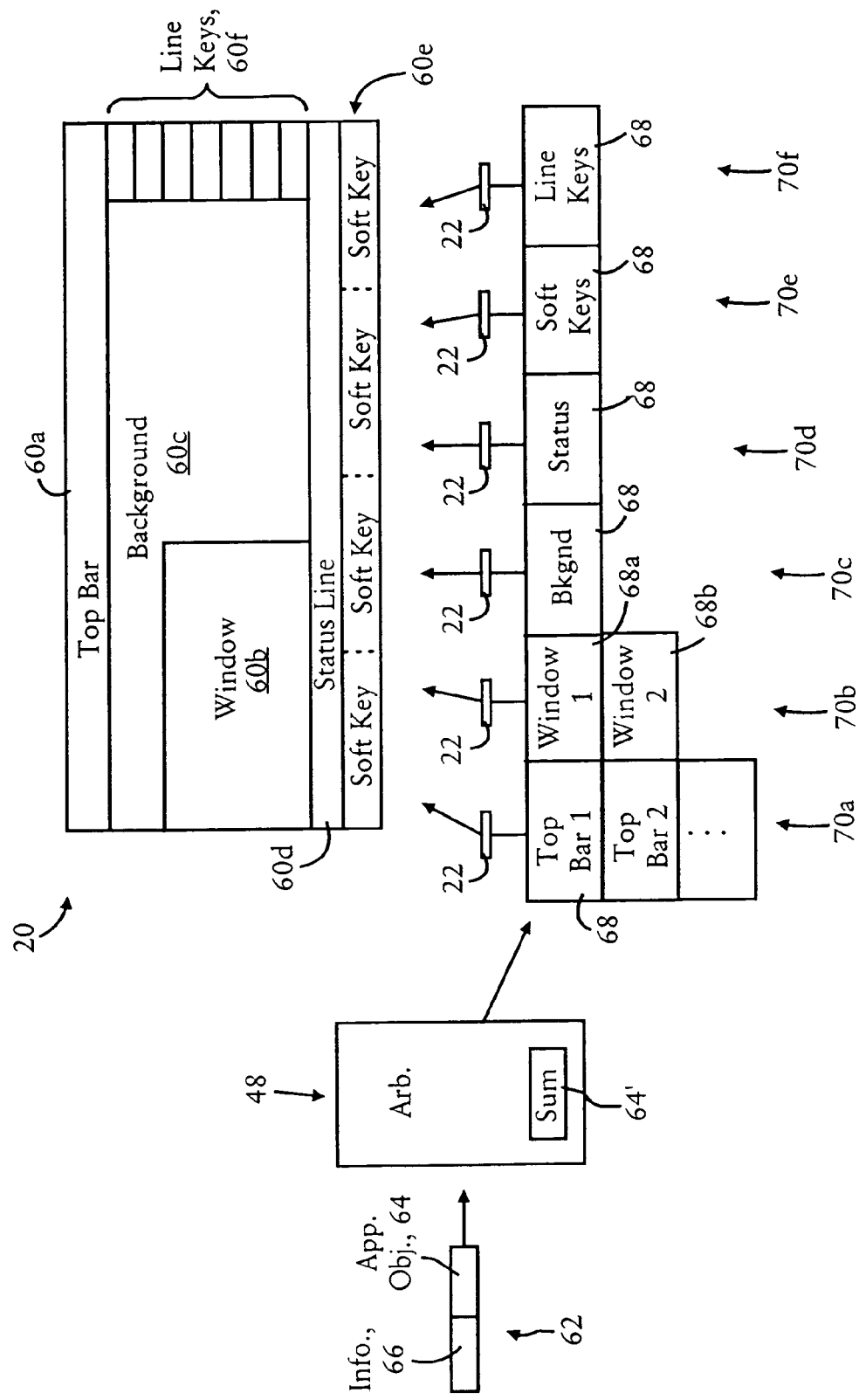
FIG. 3 is a diagram illustrating the interface controller and the arbitrator used to control the display of the Voice over IP telephony device of FIGS. 1 and 2, according to an embodiment of the present invention.

FIG. 3 is a diagram illustrating in further detail the display control by the Voice over IP telephony device 12 based on arbitration of display requests, according to an embodiment of the present invention. The disclosed embodiment controls the display of the display elements 22 by partitioning the display 20 into distinct and unique display areas 60. In particular, the interface controller 25 utilizes the arbitrator 48 for partitioning of the display 20 into prescribed display areas 60. For example, the arbitrator 48 partitions the display 20 into a top bar display area 60*a* providing high-priority status information (e.g., state information for an active user service), a window area 60*b* for displaying display elements 22 for the active user service, a background display area 60*c*, a status line display area 60*d*, a soft key display area 60*e*, and a line key display area 60*f*. These exemplary display areas are defined by a basic set of XML documents 90 within the XML file store 40; hence, any application resource can reference any one of the display areas 60, as specified in the XML documents 90, in order to request display of an application object within a specified display area 60. For example, in response to the controller 25 sending a message 34 that the user has pressed a dial key, the telephony application 30*a* will send a display request (in the form of a message 32) to the XML module 38; the XML module 38 parses the appropriate XML document, and outputs in response a display request 62 that includes an application object 64 and application characteristics 66, for example a specified application class, or information related to the corresponding application object 64 such as a specified priority in the form of a service level identifier and/or an application state identifier. The arbitrator 48, in response to reception of the display request 62, inserts the application object 64 (containing application-based information for display) into a display list entry 68 for a corresponding display list 70.

The arbitrator 48 is configured for selecting the display list entries 68 to be displayed based on different rules defining the arbitration. For example, the arbitrator may apply a first-come first-serve arbitration; however, the arbitrator also may apply rule-based heuristics to select which display list entries 68 are to be displayed.

For example, the arbitrator 48 may execute a set of rules, stored as XML documents accessable by the arbitrator 48, that define the logic (heuristics) for determining which elements are to be displayed. Certain rules may specify arbitration based on service level (i.e., importance) and application state for a particular application service; in this case, the application 30 may provide a service level identifier and an application state identifier for the arbitrator 48 to make its decision. The service level identifier may be supplied locally (e.g., by the XML module 38), or remotely (e.g., included with the display request via the IP network 14).

As illustrated in FIG. 3, the stack 36 is configured for storing display lists 70 for the respective display areas 60, such that each display area 60 has a corresponding display list 70; each display list includes at least one corresponding display list entry 68 for storage of an application object 64 to be displayed in the corresponding display area 60. In addition to identifying the display list 70 for an application object 64, the arbitrator 48 also selects a display list entry 68 to be displayed as the display elements 22.

Hence, use of the arbitrator 48 to define the display areas 60, manage the respective display lists 70 and select a display list entry 68 to be displayed as a display element 22 enables executable resources such as the telephony application 30*a*, the device manager 30*b*, the notification server 16*d*, etc. to send requests to display application objects within the specified display areas 60. The arbitrator 48, based on the display request 62, or an external event such as an event message 54, or the detection of a user input, determines whether the application object 64 within the received display request 62 should be displayed, and in which display area 60. As apparent from the foregoing, the arbitrator 48 may identify the display area 60 for the received application object 64 based on determining the nature of the application object 64 (e.g., application class, stated priority, application service lifetime, etc.), or the display area 60 may be specified within the display request 62.

As described below, the arbitrator 48 may also generate a new application object 64' that represents a compilation of information from multiple display requests, for example a list of incoming e-mail messages, where each e-mail message was received as a separate display request 64. Hence, the arbitrator 48 may dynamically generate its own application object as a summary of received display requests, enabling a user to view different application services in summary form; as apparent from the foregoing, selection by the user of a display element specifying a summary form may cause the arbitrator 48 to open up a new display element within the window 60*b*, providing additional information for the user. Another example involves the use of instant messaging services by the Voice over IP telephony device 12, wherein instant messages may be temporarily suspended based on prescribed priority conditions determined by the arbitrator 48, for example presence status. Additional details related to presence based applications within the Voice over IP telephony device 12 are disclosed in commonly assigned, copending application Ser. No. 09/908,578, filed Jul. 20, 2001, entitled "Integration of Presence Services within a Network Enabled Telephony Device", the disclosure of which is incorporated in its entirety herein by reference.

Figure 4:
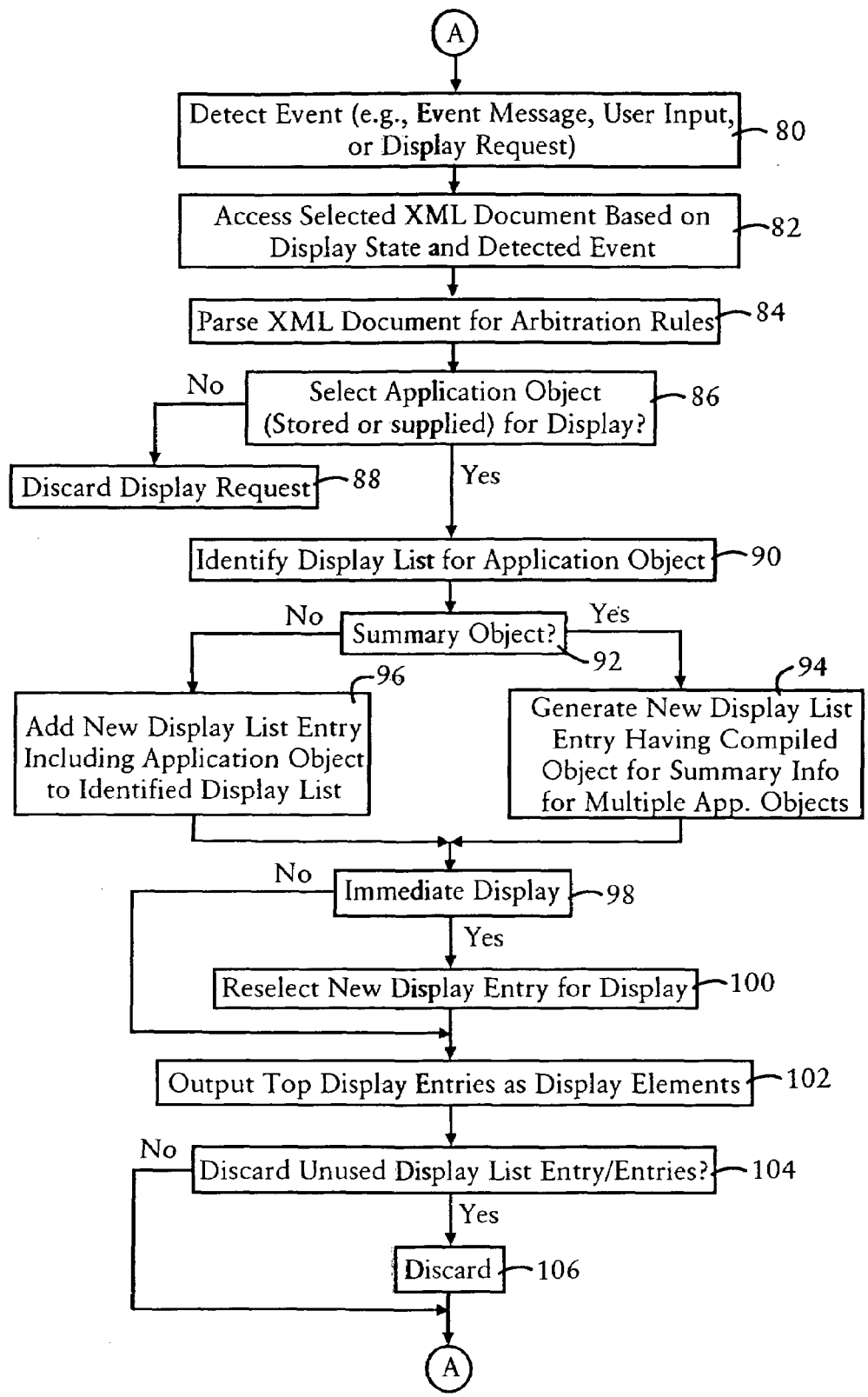
FIG. 4 is a diagram illustrating the method of arbitrating display requests for the display areas of the Voice over IP telephony device, according to an embodiment of the present invention.

FIG. 4 is a diagram illustrating the method of controlling the display 20 of the Voice over IP telephony device 12 according to an embodiment of the present invention. The steps described in FIG. 4 can be implemented as executable code stored on a computer readable medium (e.g., a hard disk drive, a floppy drive, a random access memory, a read only memory, an EPROM, a compact disc, etc.).

The method begins in step 80, where the XML module 38 detects an event, for example an event message 54 that specifies an asynchronous event, a user input (e.g., the user pressing a specified key), or a received display request 62. The XML module 38 accesses in step 82 a selected XML document based on the display state and the detected event, and parses the XML document to provide a display request 62 having the application object 64 to be displayed. The display request 62 is supplied to the arbitrator 48, which parses in step 84 an XML document in order to determine the arbitration rules to be applied for the given application state.

Based on the determined arbitration rules, the arbitrator 48 determines in step 86 whether the application object 64, which typically includes a display element identifier specifying a display element stored locally in the GUI element table 44, should be selected for display. If the arbitrator 48 determines that the application object should not be displayed, for example due to a low priority or due to an incompatible user state, etc., the arbitrator 48 discards the display request in step 88 without any change to the display 20. Hence, instances may arise where an executable application sends a display request, however the display object is never displayed due to the arbitration rules applied by the arbitrator 48.

If in step 86 the arbitrator 48 determines the application object (e.g., object 64) should be displayed, the arbitrator 48 identifies the display list 70 to be used for storage of the application object 64 in step 90. For example, if the application object 64 specifies a pop-up message, the arbitrator 48 may select the display list 70*b* corresponding to the window display areas 60*b*.

The arbitrator 48 determines in step 92 whether a summary object 64' should be generated. If a summary object 64' is needed, the arbitrator 48 adds a new display list entry 68 including a compiled summary object 64' that specifies the summary information for multiple application objects in step 94. If no summary object is needed, the arbitrator 48 adds in step 96 the display list entry 68 including the application object 64 to the identified display list 70.

The arbitrator 48 then determines in step 98 whether the newly added display list entry 68 should be immediately displayed; for example, the arbitrator 48 may determine that a pop up message specified in a display list entry 68*b* cannot be displayed until the user has completed a dialing sequence for a VoIP telephony session, displayed using the display list entry 68*a*. Hence, the display list entries may be reselected once the user has completed a prescribed application state with a given application.

If in step 98 the newly added display list entry 68 should be immediately displayed, the arbitrator 48 reselects the new display entry for display in step 100, and outputs the top display entries 68 for each display list 70 in step 102 as display elements 22 for the respective display areas 60.

The arbitrator 48 also determines in step 104 whether any unused display list entries 68 should be discarded, and selectively discards in step 106 any unused display list entries 68.

According to the disclosed embodiment, display of information from multiple arbitrary applications may be effectively managed based on providing an application programming interface for display operations, where an executable application may specify a request to display an application object within a prescribed display area. Moreover, use of arbitration based on local display status, application state, user input, event messages, etc., enables the user to receive effectively managed display content from multiple application services, without being overwhelmed by low priority display information. In addition, since no single executable application controls the entire display 20, the arbitrator can present the appropriate data to the user based on a number of context sensitive heuristics.

While this invention has been described in connection with what is presently considered to be the most practical and preferred embodiment, it is to be understood that the invention is not limited to the disclosed embodiments, but, on the contrary, is intended to cover various modifications and equivalent arrangements included within the spirit and scope of the appended claims.

What is claimed is:

1. A network-enabled user interface device, the device including:
   a display screen configured for displaying display elements within respective distinct display areas;
   a user input interface configured for supplying user inputs;
   an application controller configured for obtaining display requests from executable application resources, the application controller including a network interface configured for receiving at least a portion of the display requests from a corresponding remote group of the executable application resources via an open protocol network; and
   an interface controller configured for partitioning the display screen into the distinct display areas, thereby preventing any of the display areas from ever overlapping another one of the display areas, and outputting the display elements for the respective distinct display areas, the interface controller including an arbitrator configured for selecting, from the display requests, the display element for each corresponding display area based on at least one of a corresponding determined condition and a determined presence of a selected one of the user inputs.

2. The device of claim 1, wherein the interface controller further includes, for each of the display areas, a corresponding display list having at least one corresponding display list entry for storage of an application object, the arbitrator configured for selecting, for each of the display areas, a corresponding one of the display list entries for display of the corresponding application object as the corresponding display element.

3. The device of claim 2, wherein the arbitrator is configured for reselecting the display list entry for display of the corresponding application object for a selected one of the display areas based on at least one of a user input, an application characteristic, and an event message.

4. The device of claim 3, wherein the interface controller further includes a display abstraction interface configured for generating display-specific images for display of the respective display elements by the display screen.

5. The device of claim 3, wherein the arbitrator is configured for selectively adding each display list entry to the corresponding display list based on the corresponding application object.

6. The device of claim 5, wherein the arbitrator is configured for selecting the display list entry to be displayed, for an application object specified within one of the display requests, based on a determined class for the corresponding executable application resource.

7. The device of claim 6, wherein the arbitrator is configured for generating a new application object, representing a compilation of information from a selected group of the display requests, and adding a new display list entry containing the application object to a selected one of the display lists.

8. The device of claim 7, wherein the open protocol network is an Internet Protocol network.

9. The device of claim 3, wherein the application characteristic includes any one of a determined application service lifetime, a determined application class, and a specified priority within the display request.

10. The device of claim 3, wherein the arbitrator is configured for selectively deleting an identified display list entry based on at least one of the user input, the application characteristic, and the event message.

11. The device of claim 3, wherein the arbitrator is configured for generating a new application object, representing a compilation of information from a selected a group of the display requests, and adding a new display list entry containing the application object to a selected one of the display lists.

12. The device of claim 1, wherein the arbitrator is configured for selecting the display element for each corresponding display area based on parsing an extensible markup language (XML) document that specifies at least one rule for determining each selected display element.

13. A method of controlling a display screen of a network-enabled user interface device configured for network-based communications via an open protocol network, the method comprising:
   receiving application-based display requests from executable application resources, at least a portion of the display requests received via an open protocol network;
   selecting display elements to be displayed within respective distinct display areas of a display screen, based on arbitrating the display requests relative to at least one of a corresponding determined condition and a determined presence of a selected user input;
   partitioning, by the network-enabled user interface device, the display screen into the distinct display areas thereby preventing any of the display areas from ever overlapping another one of the display areas; and
   outputting the display elements for display within the respective distinct display areas.

14. The method of claim 13, further comprising providing, for each of the display areas, a corresponding display list having at least one corresponding display list entry for storage of an application object, the selecting step including selecting, for each of the display areas, a corresponding one of the display list entries for display of the corresponding application object as the corresponding display element.

15. The method of claim 14, wherein the selecting step further includes reselecting the display list entry for display of the corresponding application object for a selected one of the display areas, based on at least one of a user input, an application characteristic, and an event message.

16. The method of claim 15, further comprising generating display-specific images for display of the respective display elements by the display screen.

17. The method of claim 15, wherein the providing step includes selectively adding each display list entry to the corresponding display list based on the corresponding application object.

18. The method of claim 17, wherein the selecting step includes selecting the display list entry to be displayed, for an application object specified within one of the display requests, based on a determined class for the corresponding executable application resource.

19. The method of claim 18, wherein the providing step includes generating a new application object, representing a compilation of information from a selected group of the display requests, and adding a new display list entry containing the application object to a selected one of the display lists.

20. The method of claim 19, wherein the open protocol network is an Internet Protocol network.

21. The method of claim 15, wherein the application characteristic includes any one of a determined application service lifetime, a determined application class, and a specified priority within the display request.

22. The method of claim 15, further comprising selectively deleting an identified display list entry based on at least one of the user input, the application characteristic, and the event message.

23. The method of claim 15, wherein the providing step includes generating a new application object, representing a compilation of information from a selected group of the display requests, and adding a new display list entry containing the application object to a selected one of the display lists.

24. The method of claim 13, wherein the selecting step includes parsing a selected XML document in response to at least one of a user input and the determined condition for selecting a corresponding display element to be displayed, the determined condition including reception of one of the display requests, and an event message.

25. A computer readable medium having stored thereon sequences of instructions for controlling a display screen of a network-enabled user interface device configured for network-based communications via an open protocol network, the sequences of instructions including instructions for performing the steps of:
receiving application-based display requests from executable application resources, at least a portion of the display requests received via an open protocol network;
selecting display elements to be displayed within respective distinct display areas of a display screen, based on arbitrating the display requests relative to at least one of a corresponding determined condition and a determined presence of a selected user input;
partitioning, by the network-enabled user interface device, the display screen into the distinct display areas thereby preventing any of the display areas from ever overlapping another one of the display areas; and
outputting the display elements for display within the respective distinct display areas.

26. The medium of claim 25, further comprising instructions for performing the step of providing, for each of the display areas, a corresponding display list having at least one corresponding display list entry for storage of an application object, the selecting step including selecting, for each of the display areas, a corresponding one of the display list entries for display of the corresponding application object as the corresponding display element.

27. The medium of claim 26, wherein the selecting step further includes reselecting the display list entry for display of the corresponding application object for a selected one of the display areas, based on at least one of a user input, an application characteristic, and an event message.

28. The medium of claim 27, further comprising instructions for performing the step of generating display-specific images for display of the respective display elements by the display screen.

29. The medium of claim 26, wherein the providing step includes selectively adding each display list entry to the corresponding display list based on the corresponding application object.

30. The medium of claim 29, wherein the selecting step includes selecting the display list entry to be displayed, for an application object specified within one of the display requests, based on a determined class for the corresponding executable application resource.

31. The medium of claim 30, wherein the providing step includes generating a new application object, representing a compilation of information from a selected group of the display requests, and adding a new display list entry containing the application object to a selected one of the display lists.

32. The medium of claim 31, wherein the open protocol network is an Internet Protocol network.

33. The medium of claim 27, wherein the application characteristic includes any one of a determined application service lifetime, a determined application class, and a specified priority within the display request.

34. The medium of claim 27, further comprising instructions for performing the step of selectively deleting an identified display list entry based on at least one of the user input, the application characteristic, and the event message.

35. The medium of claim 27, wherein the providing step includes generating a new application object, representing a compilation of information from a selected group of the display requests, and adding a new display list entry containing the application object to a selected one of the display lists.

36. The medium of claim 25, wherein the selecting step includes parsing a selected XML document in response to at least one of a user input and the determined condition for selecting a corresponding display element to be displayed, the determined condition including reception of one of the display requests, and an event message.

37. A network-enabled user interface device having a display screen and configured for network-based communications via an open protocol network, the device comprising:
means for receiving application-based display requests from executable application resources, at least a portion of the display requests received via an open protocol network;
means for selecting display elements to be displayed within respective distinct display areas of a display screen, based on arbitrating the display requests relative to at least one of a corresponding determined condition and a determined presence of a selected user input, the means for selecting configured for partitioning the display screen into the distinct display areas and thereby preventing any of the display areas from ever overlapping another one of the display areas; and
means for outputting the display elements for display within the respective distinct display areas.

38. The device of claim 37, wherein the selecting means is configured for providing, for each of the display areas, a corresponding display list having at least one corresponding display list entry for storage of an application object, the selecting means configured for selecting, for each of the display areas, a corresponding one of the display list entries for display of the corresponding application object as the corresponding display element.

39. The device of claim 38, wherein the selecting means is configured for reselecting the display list entry for display of the corresponding application object for a selected one of the display areas, based on at least one of a user input, an application characteristic, and an event message.

40. The device of claim 39, further comprising means for generating display-specific images for display of the respective display elements by the display screen.

41. The device of claim 39, wherein the selecting means is configured for selectively adding each display list entry to the corresponding display list based on the corresponding application object.

42. The device of claim 41, wherein the selecting means is configured for selecting the display list entry to be displayed, for an application object specified within one of the display requests, based on a determined class for the corresponding executable application resource.

43. The device of claim 42, wherein the selecting means is configured for generating a new application object, representing a compilation of information from a selected group of the display requests, and adding a new display list entry containing the application object to a selected one of the display lists.

44. The device of claim 43, wherein the open protocol network is an Internet Protocol network.

45. The device of claim 39, wherein the application characteristic includes any one of a determined application service lifetime, a determined application class, and a specified priority within the display request.

46. The device of claim 39, wherein the selecting means is configured for selectively deleting an identified display list entry based on at least one of the user input, the application characteristic, and the event message.

47. The device of claim 39, wherein the selecting means is configured for generating a new application object, representing a compilation of information from a selected group of the display requests, and adding a new display list entry containing the application object to a selected one of the display lists.

48. The device of claim 37, wherein the selecting means is configured for parsing a selected XML document in response to at least one of a user input and the determined condition for selecting a corresponding display element to be displayed, the determined condition including reception of one of the display requests, and an event message.

* * * * *